Feb. 1, 1927.
C. E. MAYNARD
TUBE MANUFACTURE
Filed May 5, 1923
1,615,992
3 Sheets-Sheet 1
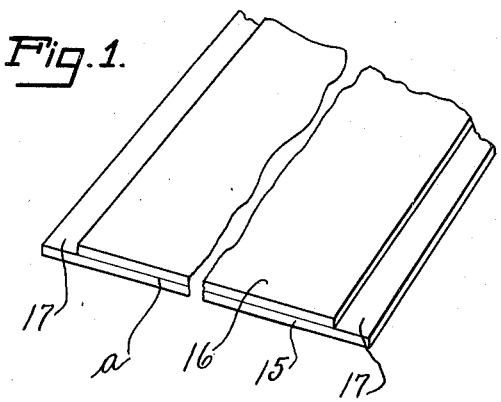
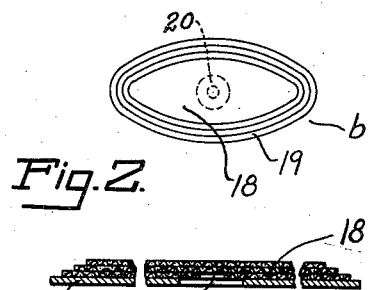
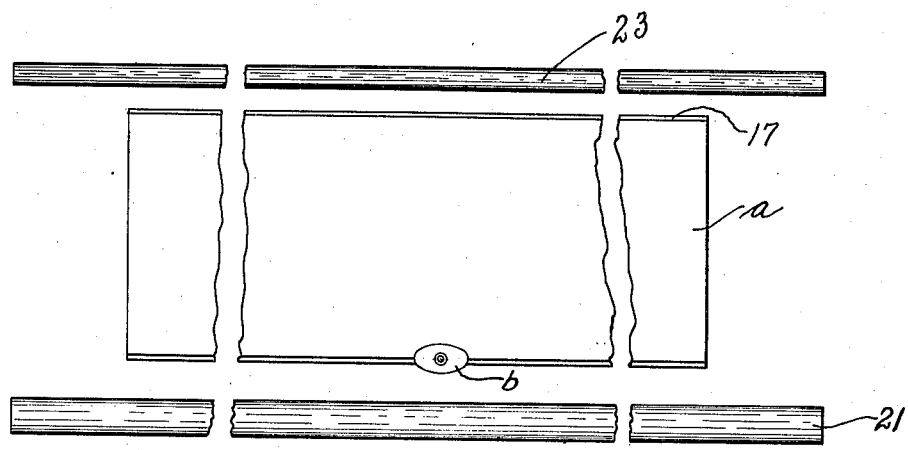
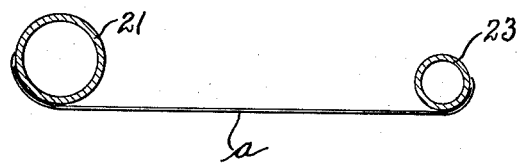
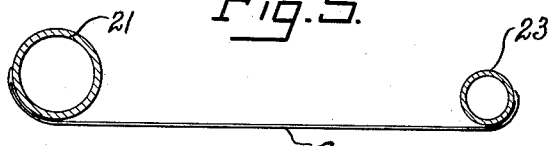
INVENTOR.
Charles Edgar Maynard
BY
Edward C. Taylor
ATTORNEY Feb. 1, 1927.  
C. E. MAYNARD  
TUBE MANUFACTURE  
Filed May 5, 1923    3 Sheets-Sheet 2  
1,615,992

INVENTOR.  
Charles Edgar Maynard  
BY  
Edward C. Taylor  
ATTORNEY.

Feb. 1, 1927.

C. E. MAYNARD

TUBE MANUFACTURE

Filed May 5, 1923

INVENTOR.
Charles Edgar Maynard.
BY
Edward C. Taylor
ATTORNEY.

Patented Feb. 1, 1927.

1,615,992

UNITED STATES PATENT OFFICE.

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS.

TUBE MANUFACTURE.

Application filed May 5, 1923. Serial No. 636,855.

This invention relates to the manufacture of rubber tubes, such for example as those used as inner tubes for automobile tire casings. It has for its object the improvement of the manufacture of rubber tubes in various particulars of economy, rapidity, and reliability, and in various other features which will appear more fully in the following description and claims.

The present application is a continuation in part of my prior application Serial No. 388,758, filed June 14, 1920.

Prior methods of making inner tubes may be divided into three classes: First, methods in which the tube is produced by a "tubing" machine similar to machines for making lead pipe; second, methods in which the tube is formed from a flat sheet, with the longitudinal seam formed as a butt-joint, cemented or otherwise; and third, methods in which the tube is rolled directly onto the mandrel from a flat sheet of sufficient width to form a laminated tube of a plurality of plies.

It is the object of my invention to make a laminated tube of the third general class in such a manner that the expensive steps hitherto considered necessary for various reasons, including the protection of the tube against the harmful effects of entrapped air or gas, may be omitted. By my improved process I am able to combine the advantageous features of all the methods mentioned above and at the same time materially reduce the expense of the operation.

Tubes constructed according to the first two of these methods have been vulcanized on mandrels in open steam without further confining means than a tape which sealed the ends of the tube to the mandrel. These methods, however, have possessed considerable operating disadvantages since they required that the tube be first formed and then placed on the mandrel as a separate operation, and because a single ply of stock, however formed, may contain holes which will cause leakage from the completed tube. Tubes of the third class have been free from these defects by reason of their being formed directly on the mandrel and being of a laminated nature so that any holes would not be continuous through the laminated wall of the tube, but in commercial production it has been found necessary to vulcanize the tube under the compacting influence of a spiral wrapping, or at least to remove, by a temporary spiral wrapping before vulcanization, any air which might have become entrapped between the tube and the mandrel. This wrapper not only made unsightly helical ridges and lines of weakness in the vulcanized tube, but also was expensive to wind on and off and presented additional expense due to its rapid deterioration. Proposals have hitherto been made directed towards the vulcanization of rolled tubes in open steam without the use of a confining wrapping or a preliminary expulsion of the air, but so far as I am aware none of these proposals has solved the problems encountered in making tubes in a commercial way. Even though it be assumed that individual tubes might be vulcanized successfully by one of these prior methods and without observing the safeguards forming the invention described below, and that some tubes in a large run might come out with no defects no matter what method is employed, these erratic examples of unappreciated good fortune are of no assistance for purposes of commercial tube manufacture, since the successful tubes will be accompanied by a large percentage of tubes which are defective and represent a total loss. The problem has been to devise a method which will not only produce tubes of the laminated type without the use of outer wrappings, but will so produce them with only a negligible quantity of "seconds" or defective tubes.

By experiments extending over a long period I have found that such a commercially practicable result may be consistently attained by following the steps outlined below, and in observing certain features of invention which will be pointed out. The invention will now be considered in detail in connection with the accompanying drawings, in which—

Fig. 1 is a perspective view of a sheet of stock such as I prefer to use in building tubes according to this invention;

Fig. 2 is a plan view of a valve pad;

Fig. 3 is a longitudinal section thereof on an enlarged scale;

Fig. 4 is a plan showing the materials ready for the rolling of the tube;

Fig. 5 is a diagrammatic section illustrating the start of the rolling;

Fig. 6 is a similar view illustrating a tensioning step;

Figure 7:
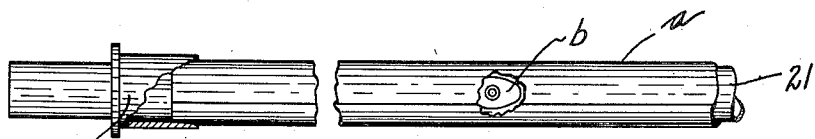
Fig. 7 is a detail of a tube mounted on a mandrel ready for vulcanization, partly broken away.

The first feature which will be mentioned is the character of the stock. Any good tube stock may be employed but it is desirable that the stock should be substantially dry and non-adhesive. It is well recognized by rubber workers that stock can be run on the calender so as to dry, or "bloom" with a fine dust of sulfur, when it cools in the rolls into which it is wound with intervening layers of a separating fabric such as cotton sheeting. The detailed manner of regulating the stock on the warming mills and calenders so as to produce this result will be obvious to any skilled calender operator, and need not be set forth here beyond pointing out the desirability of obtaining the result in this tube manufacture. I need only state that the stock should be milled until it will calender smoothly, but not too long, so that when the cool stock is removed from the liners it can be piled one sheet on the other without adhering. Thus being able to pile the sheets is a convenience in handling the stock in the tube room, but it has other advantages more nearly affecting the product. Stock that will not stick to itself is much less subject to permanent wrinkles than tacky stock, and for the successful carrying out of my process it is necessary that the stock be smooth and free from wrinkles. A further reason for using dry stock depends on the fact that it will not adhere firmly to the mandrel, at least during preliminary stages of the vulcanization, and will therefore permit the distributing over a large area and thus the harmless dissipation of any air or gas which may be entrapped between the tube and mandrel. It has been thought necessary previously to expel this entrapped air by a spiral wrapping of fabric or other means, but my theory of the action underlying this part of the practice of my invention is that by the use of dry stock under the conditions set forth below the free distribution of the air over a sufficient area will prevent any injurious action, whereas the same quantity of air confined or pocketed by tacky stock adhering to the mandrel will necessitate special means to guard against its harmful effect, such means usually consisting of a fabric wrapping.

One other feature of the stock may be mentioned, that the vulcanization accelerator used should not act so rapidly as to "set" or partially vulcanize the stock until the latter has an opportunity to flow and close the inner seam of the tube under the fluid pressure used in vulcanization. The effect of a rapid accelerator can be counteracted by using a higher compactive pressure during vulcanization, but it is generally preferred to use the usual commercial accelerators rather than the extremely fast or so-called super-accelerators.

The sheet stock having the characteristics set forth above is preferably laminated into two plies before it is delivered to the tube builder, and has the edges of the two plies stepped off so that a marginal portion of reduced thickness will be provided on each edge of the compound sheet. Such a sheet is shown in Fig. 1, in which one sheet 15 is shown as wider than the second sheet 16, forming single-ply marginal portions 17. Preferably this compound sheet a is prepared according to my Patent No. 1,509,363, Sept. 23, 1924, in which the marginal portions, besides being thinner than the body of the sheet, are of a tacky rather than a dry consistency. This is useful in the formation of the tube for reasons which will appear more clearly in a description of the rolling process. A similar form of step-off can be secured by using two sheets of the same width but offset slightly from each other.

According to the preferred method of preparing the adhesive edge stock set forth in my Patent No. 1,509,363, the two-ply sheet is wound up between turns of a pervious material such as fabric. The pressure of the fabric will cause the central part of the rubber sheet to become non-adhesive or dry, due to the accumulation of "bloom" or sulfur dust or to some other cause, while the marginal portions, which by reason of their reduced thickness are relieved of the pressure of the fabric, will remain adhesive or tacky.

There is also to be incorporated in the tube during its building a "valve pad" or reinforcement for the portion of the completed tube through which the air valve passes. This pad is laminated mainly of rubberized fabric, serving to give body and strength to the tube at this point. In order to insure success, particularly in humid weather, it is necessary to have the pads dry so that no perceptible moisture is present to be volatilized during the cure. This is conveniently done by heating the pad, and in this case the pad is preferably incorporated in the tube while it is yet warm, this insuring both that the rubber will be adhesive and that a minimum of air will be present in the material of the pad. A further precaution which should be taken for success is to vent the pad so that any gases developed or entrapped in the fabric will be safely taken care of and will not cause bubbles or blisters on vulcanization. For this purpose use is preferably made of a pad such as is shown in the patent to J. A. Bowerman, No. 1,456,357, dated May 22, 1923. A pad $b$ of this character is shown in Figs. 2 and 3. It is composed of laminated plies of rubberized fabric 18, and a rubber ply 19. Through one or more, but preferably not all, of the fabric plies and the rubber ply is a hole 20, formed after the plies are rubberized so that the cut edges of the fabric will be unsealed by rubber. This hole opens towards the mandrel as the tube is ready for vulcanization, and is closed by the unpunched fabric plies or the body of the tube, forming a recess which is closed during vulcanization but is opened when the tube is stripped from the mandrel. The use of a pad of this character will cause the gas or air in the fabric, or in the space formed next to the mandrel by the longitudinal seam of the tube to flow to the recess rather than to pass out at the edges of the pad or elsewhere along the tube and cause blisters or non-adhesion of the rubber plies.

Figure 10:
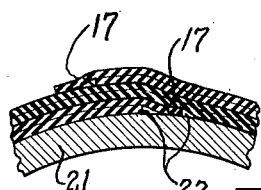
Fig. 10 is a fragmentary section showing one manner of positioning the two-ply stock on the mandrel.
Figure 11:
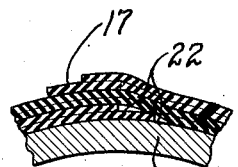
Fig. 11 is a similar view showing another manner.

With the building material so prepared the tube is ready for rolling on the mandrel. For this operation the usual rolling table with a padded top may be employed. The mandrels used are conveniently the customary straight poles 21, usually made hollow for lightness and economy of steam, and kept dry on the surface so that no moisture will be entrapped between the tube and mandrel. The two-ply stock, which is of a width sufficient to go around the mandrel preferably twice so as to give an extra lamination to the tube and of a length substantially that of the tube to be formed, is laid flat and smooth upon the table. The shoulder of the stepped-off edge which is to go next to the mandrel is preferably up, as indicated in Fig. 4, so that the pocket 22 formed will be against the mandrel as in Fig. 10 rather than between the plies as in Fig. 11. The method of Fig. 11 can be used, but does not give as complete insurance against defective tubes, and for this reason the form of Fig. 10 is preferred.

It is desirable to have both longitudinal marginal portions of the sheet in an adhesive condition, the inner edge so that it will adhere to the mandrel, and the outer edge so that it will adhere to the underlying rubber of the tube and form a tight seam. This is accomplished usually by coating both marginal portions with naphtha or other rubber solvent. If stock having the tacky edge character of that disclosed in my Patent No. 1,509,363, dated September 23, 1924, and referred to above, is used a much less amount of naphtha need be employed, the naphtha being omitted entirely if the marginal portions are sufficiently adhesive without it. The valve pad is also brushed with naphtha or otherwise made adhesive, and placed on one edge of the sheet as indicated in Fig. 4. By placing the pad at this point it will lie in the finished tube at the longitudinal rib or thickened portion formed by the overlapping edges of the sheet when the tube is rolled, and also is in position to receive in the hole 20 any gas or air present in the space formed next to the mandrel by the longitudinal seam of the tube. The pad should be flat and uncurled as it would otherwise cause trouble in the subsequent rolling.

The mandrel 21 is now placed on the longitudinal edge of the stock which is to form the inside of the tube. Due to the tacky condition of the margin of the rubber sheet, it, and the valve pad as well, will adhere to the mandrel. Upon the opposite side of the sheet is placed a weighted bar or mandrel 23, or the stock is suitably held so that it will not move on the table in the next succeeding operation. This operation consists in rolling the tube tightly on the mandrel. I have found that defective tubes will result if the rubber is rolled loosely upon the mandrel, and to avoid this trouble the sheet is preferably pulled taut, or given a lateral stretch, so that all slackness is prevented and the rolled tube preferably given a tendency to contract upon the mandrel. In practice it has been found that a suitable degree of lateral tension will result if the sheet is originally cut so that the width of the two-ply portion of the stock is sufficient just to pass twice around the mandrel, and in rolling a sufficient stretch is given to cause an overlap beyond this of say three-quarters of an inch. I believe the exact amount of stretch is unimportant provided that the rubber as rolled is taut at all points, but the figures given are useful as exemplary of one successful practice. Stretching is most conveniently accomplished by drawing the mandrel 21, to which one sheet edge is stuck, away from the bar 23 before starting the rolling, thus stretching the rubber transversely of the sheet. (Compare Figs. 5 and 6.)

Figure 8:
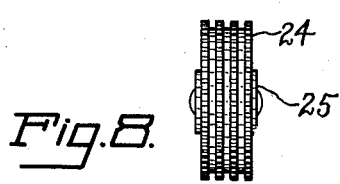
Fig. 8 is an end view of a stitching roller.
Figure 9:
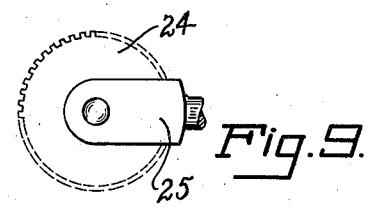
Fig. 9 is a side view thereof.

As soon as this stretching has been given the mandrel is rolled over the extended sheet, rolling it up into tube form. This rolling alone may not be sufficient to produce uniform tightness in the outer seam, where the edge of the sheet overlaps the underlying rubber, and to insure against loose seams at this point the outer edge of the fabric is preferbaly "stitched" or pressed down by a tool, one form of which is shown in Figs. 8 and 9. It comprises a roll 24 suitably journaled in a handle 25, and being corrugated on its surface somewhat after the manner of a gear hob. If this tool is rolled over the outer seam of the tube the corrugations will press the underlying plies of rubber firmly together.

It is now necessary to seal the ends of the tube to the mandrel. While many ways of accomplishing this result may be followed, I prefer to use clamps or cuffs such as shown in the patent to Little dated April 3, 1923, No. 1,450,320. These clamps are internally tapered sleeves 26 which, as shown in that patent and in Fig. 7 of the present case, are adapted to slide over the ends of the tube to compress it against the mandrel. The internal taper of the clamps forms a beveled or skived end on the tubes which is desirable in further treatment. The clamps are applied to the tubes by sliding them over the mandrel ends and driving them home upon the rubber by a sharp blow. To lubricate the surface between the clamps and the tubes, the clamps are preferably moistened with a soap solution or a solution (of for example 40 percent strength) of sodium thiosulfate in water.

Figure 14:
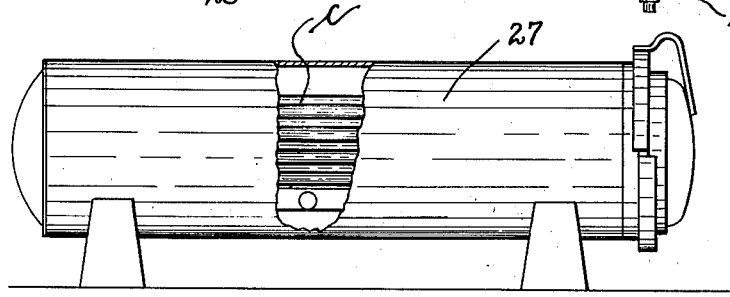
Fig. 14 is a detail of a vulcanizing heater.

The tubes are now ready for vulcanization. It is necessary for ordinary stock thicknesses to use a steam pressure somewhat higher than the 45 pounds per square inch usually employed in rubber tube vulcanizations. The ultimate test of the pressure required is that it be sufficient to insure that the inner seam of the tubes will be uniformly and regularly flattened out against the mandrel. The pressure required to do this will vary with the stock being used. For ordinary tube stock such as I have used in commercial production I find that vulcanization under a fluid pressure of 60 to 90 pounds per square inch is sufficient, and prefer from the standpoint of economy and ease of handling that the pressure be in the neighborhood of 65 pounds per square inch. As a more specific recommendation of pressure, based upon actual tests and commercial experience, reference may be made to the use of so-called uncompounded or pure gum stock. In this case I have found that the fluid pressure will be sufficient if equal in pounds per square inch to at least three times the thickness in thousandths of an inch of the least shoulder presented to the mandrel by the stock edges. Thus if two-ply stock having each ply of twenty gauge thickness (0.020″) is used with the stepped off arrangement giving single-ply marginal portions, a fluid pressure of at least sixty pounds per square inch should be used. If compounded or otherwise different stocks are used the pressure may be varied accordingly, it being in any case kept high enough to uniformly obliterate the seam formed by the inner edge of the rubber sheet. The rubber tubes on their mandrels are left in the heaters 27 (Fig. 14) with steam or other fluid in direct contact with their outer surfaces, for a period of time sufficient to vulcanize the stock used.

After vulcanization the steam supply to the heaters is turned off and water is sprayed into the heaters under sufficient pressure to play against the tubes and cool them suddenly. This injection of water condenses the steam and lowers the steam pressure, the sudden chilling of the tubes preventing any injury due to "ballooning" or expansion of entrapped air or gas. The remaining steam pressure, if any, is then removed, and the vulcanized tubes taken from the vulcanizers. It may be found desirable in some cases to reheat the tubes after cooling in order to insure that they are warm when presented for stripping from the mandrels, as the use of heated mandrels is desirable in the carrying out of the stripping and tube building operations, as will now be described.

I have found that it is desirable, in order to give further advantages and insurance against defective tubes, to have the mandrel substantially warmer than the surrounding atmosphere (preferably as warm as is convenient for the workmen to handle and in any event above the dew point for the varying atmospheric conditions that may be met with from time to time in the factory) during the rolling, seam stitching, and end clamping operations. The heat of the mandrel softens the rubber and makes it adhesive, rendering the closing of the outer and inner seams more sure, and causing the prompt evaporation of any naphtha or other solvent used in insuring the adhesive condition of the edges of the rubber sheet. If present in the rolled tubes in anything above the quantity necessary to give a tacky surface to the rubber, blemishes will occur due to the volatilization and expansion of the naphtha during vulcanization. Any naphtha in the present case that is not volatilized by the heat of the mandrel during rolling will be driven out the open seam of the tube before the end clamps are put on. The warm mandrel also expands the air or vapor entrapped between the tube and the mandrel, particularly along the shoulder of the inner seam, and causes a portion of this air or vapor to be expelled from the ends of the tube in the period between the rolling and end clamping operations, when the tube ends are unsealed and the air or vapor can pass out readily. There is on this account even less air or vapor when the tube ends are sealed by the clamps than was originally present, thus reducing still further the danger of trouble from its expansion during vulcanization. Maintaining the mandrels hot at the time when the tubes are rolled also prevents the presence of any moisture on the mandrels which might result from the condensation of steam or atmospheric moisture on the surface of a cold mandrel as they stand around before rolling.

In the preferred manner of carrying out this part of the invention the mandrels, with the vulcanized tubes thereon and still hot from the vulcanizer, are brought to a station where the tubes are stripped, and the mandrels transferred to the rolling table and thence to the stitching and clamping operations before they have had sufficient time to cool. The use of hot tubes and mandrels at the stripping station has advantages in greatly facilitating the stripping, and the use of these already heated mandrels in rolling utilizes this feature and increases its advantages by continuing the use of the already hot mandrel in further steps.

It is also preferable to have the clamps or cuffs heated at the time when they are placed on the mandrels. Cold rubber offers much greater resistance to flow than hot rubber, and the heat of the clamps cooperates with the heat of the mandrel to cause the rubber to react more quickly and surely to the clamping action. In practice the cuffs are preferably removed just before the tubes are stripped from the mandrels, and as at that time they are hot (which in itself aids greatly in the ease of removing them) their heat is preferably conserved and utilized by passing them directly from the stripping station to the station where they are applied to the tubes.

Figure 12:
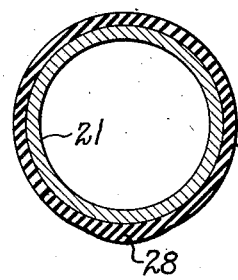
Fig. 12 is a section of the completed tube on the mandrel.
Figure 13:
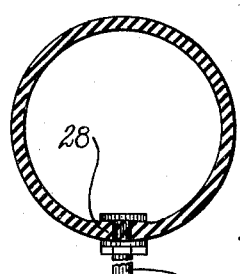
Fig. 13 is a section of the tube after being stripped from the mandrel.

The vulcanized tube c on the mandrel is shown in Fig. 12. In stripping the tube is inverted and will present the appearance of Fig. 13, in which the rib or thickened portion 28, through which the air valve 29 passes, is apparent on the inside.

Figure 15:
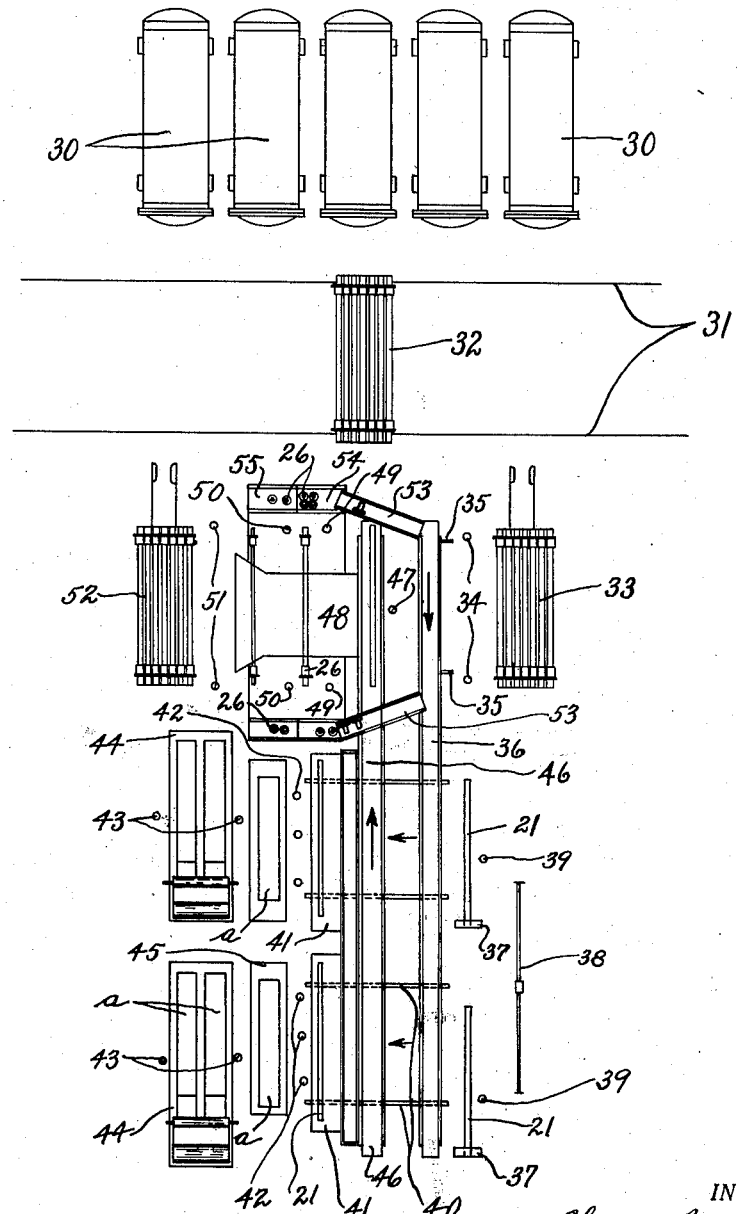
Fig. 15 is a diagrammatic plan of an apparatus designed to insure the carrying out of certain features of the invention.

In order to insure that the workmen will carry out certain features of the invention, particularly those relating to the use of the heated mandrels and clamps, I prefer to use an apparatus of which a diagrammatic layout has been shown in Fig. 15. A series of vulcanizing heaters has been indicated at 30. Running in front of the heaters is a track 31 upon which carriages 32 run to convey the loads of unvulcanized or vulcanized tubes to or from the heaters. A load of tubes freshly removed from the vulcanizer and still hot is shown at 33. Operators 34 remove the tubes from the load, knock off the end clamps 26 on supports 35, and place the mandrels, with the vulcanized tubes thereon, upon a conveyor 36 which takes them singly and successively to the stripping stations. In order to balance the speed of the stripping operations with that of the remainder of the process, two of these stations are preferably provided, indicated on the drawings by the blocks 37 in which the mandrels 21 with the vulcanized tubes thereon are held while the tube is being stripped, as is well understood in the art. The stripped tubes may be thrown upon racks 38, where they are examined and removed for further treatment.

The tubes received by the two stripping operators 39 are presented successively by the conveyor 36 as rapidly as they can dispose of them. As there are two stripping operators to a single load of tubes, the latter are all stripped before they have a chance to cool. The still warm mandrels are placed by the stripping operators upon inclined runways 40, down which they roll until they are stopped by an abutment in front of tube rolling tables 41. The operators 42 at each of these tables take a piece of sheet stock a (previously cut from a roll by operators 43 at table 44) from a pile on table 45 and place it on the rolling table. They then pick the still warm mandrel from the point where it was stopped in front of the table, and proceed with the rolling as described elsewhere in this specification.

As soon as the tube is rolled it is placed upon a conveyor 46, running in the opposite direction from the conveyor 36, and carrying the rolled tube to an operator 47 (or a suitable mechanical device) who stitches or rolls down the outer seam of the rubber as with the tool shown in Figs. 8 and 9. The tube then rolls down an inclined way 48, passing operators 49 who place the clamps 26 on the tube ends and operators 50 who drive the clamps firmly in place, and finally being transferred by operators 51 to a carriage 52 for placement in a vulcanizing heater. During the interval between the rolling and the application of the clamps the steady movement of the conveyor insures that the mandrels are presented for clamping before they have a chance to cool, with the attendant advantages pointed out above.

The clamps after being stripped from the tubes by operators 34 are placed by them on inclined ways 53 down which they slide into a receptacle 54. A dipping tank 55 is provided by immersion in which the clamps may receive a light coat of the lubricant, such as sodium thiosulfate, which makes easier the sliding of the clamps onto the ends of the tubes and prevents their sticking after vulcanization. This prompt passage of the clamps from the stripping to the application station prevents the clamps from cooling and produces a beneficial effect in the product, as the heat of the clamps causes them to soften the rubber and seat more closely and accurately as they are being forced on.

While the conveyor unit described above is not essential for the carrying out of the process forming the present invention, it acts as a means for insuring that the full benefit of the process will be consistently utilized without constant supervision of the workmen. In the following claims I will point out more particularly the features which unite to increase the uniformity and economy of tube manufacture according to my invention:

1. A method of making rubber tubes which comprises (a) preparing a sheet of rubber of the length desired for the tube and of a width sufficient to pass at least twice around a forming mandrel, (b) placing on one longitudinal edge of the sheet a dried laminated fabric valve pad having a recess cut through certain fabric plies and opening towards what is to be the inside of the tube, (c) rolling the sheet so prepared tightly around a mandrel with said longitudinal edge in contact with the mandrel, (d) binding the ends of the tube to the mandrel, (e) vulcanizing the tube on the mandrel under external pressure furnished solely by a fluid under sufficient pressure to obliterate the inside longitudinal seam.

2. A method of making a rubber tube which comprises (a) rolling sheet rubber tightly around a mandrel whereby a shoulder is formed by the inner edge of the stock against the mandrel, (b) pressing the outer edge of the stock into tight adhesion with the underlying rubber, (c) sealing the ends of the tube to the mandrel, (d) vulcanizing the tube under the sole compactive influence of a fluid pressure of at least three pounds per square inch per thousandth of an inch thickness of the rubber at the shoulder.

3. A method of making a rubber tube which comprises (a) preparing a two-ply sheet of rubber, one ply extending beyond the other at least at one edge of the sheet to form a step-off, the sheet being of the length desired for the tube and of a width sufficient to pass at least twice around a forming mandrel, (b) rolling the sheet so prepared tightly around a forming mandrel with the stepped-off edge of the sheet adjacent the mandrel, and with the outer edge of the rolled sheet in tight adhesion with the underlying rubber, (c) sealing the ends of the tube to the mandrel, (d) vulcanizing the tube under the sole compactive influence of a fluid pressure sufficient to obliterate the inner seam caused by the stepped-off edge of the stock.

4. A method of making a rubber tube which comprises (a) preparing a two-ply sheet of rubber, one ply extending beyond the other at least at one edge of the sheet to form a step-off, the sheet being of the length desired for the tube and of a width sufficient to pass at least twice around a forming mandrel, (b) rolling the sheet so prepared tightly around a forming mandrel with the stepped-off edge of the sheet adjacent the mandrel, and with the outer edge of the rolled sheet in tight adhesion with the underlying rubber, (c) sealing the ends of the tube to the mandrel, (d) vulcanizing the tube under the sole compactive influence of a fluid pressure of at least three pounds per square inch per thousandth of an inch thickness of each ply of the laminated sheet.

5. A method of making a rubber tube which comprises preparing a two-ply sheet of rubber, one ply extending beyond the other at each edge of the sheet, and with the single-ply portion of the sheet normally adhesive, the body of the sheet being substantially non-adhesive, stretching the sheet so prepared tightly around a forming mandrel with one stepped-off edge against the mandrel and the other pressed into firm adhesion with the underlying rubber, sealing the ends of the tube to the mandrel, and then vulcanizing the tube under the sole compactive influence of a fluid pressure sufficient to obliterate the inner seam caused by the stepped-off edge of the sheet.

6. The method of making inner tubes which consists in rolling a sheet of rubber stock on a mandrel warmed to a temperature in excess of the dew point to laminate said sheet into tube form on the warm mandrel, binding the ends only of said tube while the mandrel is still warm, and finally vulcanizing said tube on the mandrel by exposing it to a heated fluid of sufficient pressure to obliterate the seams of the rubber surface on the mandrel between its sealed ends.

7. The method of making inner tubes which consists in laminating a sheet of rubber stock on a mandrel warmed to a temperature in excess of the dew point, sealing the ends of the laminated tube on the mandrel while the latter is still warm, and then vulcanizing the tube.

CHARLES EDGAR MAYNARD.